(12) United States Patent
Rowe et al.

(10) Patent No.: US 12,487,096 B2
(45) Date of Patent: Dec. 2, 2025

(54) OPTIMUM LAP DERIVATION VIA TRACK SEGMENTATION AND PRIOR RACING MEASUREMENTS

(71) Applicant: Oracle International Corporation, Redwood Shores, CA (US)

(72) Inventors: Matthew Charles Rowe, Bletchley (GB); Sahil Malhotra, Hampton (GB); Sergio Aldea Lopez, Valladolid (ES); Oleg Gennadievich Shevelev, Chislehurst (GB); Alberto Polleri, London (GB)

(73) Assignee: Oracle International Corporation, Redwood Shores, CA (US)

( * ) Notice: Subject to any disclaimer, the term of this patent is extended or adjusted under 35 U.S.C. 154(b) by 238 days.

(21) Appl. No.: 18/450,003

(22) Filed: Aug. 15, 2023

(65) Prior Publication Data

US 2025/0060220 A1   Feb. 20, 2025

(51) Int. Cl.
*G01C 21/00* (2006.01)
*G01C 21/34* (2006.01)

(52) U.S. Cl.
CPC ................. *G01C 21/3492* (2013.01)

(58) Field of Classification Search
CPC .................................. G01C 21/3492
See application file for complete search history.

(56) References Cited

U.S. PATENT DOCUMENTS

| 6,260,759 | B1 * | 7/2001 | Nguyen | G01S 7/066 |
| | | | | 342/90 |
| 2022/0281456 | A1 * | 9/2022 | Giovanardi | G06V 20/58 |
| 2023/0059083 | A1 * | 2/2023 | Verma | G06F 16/248 |

* cited by examiner

*Primary Examiner* — Adnan M Mirza
(74) *Attorney, Agent, or Firm* — Invoke

(57) ABSTRACT

Techniques for deriving an optimal traversal path on a racetrack are disclosed. The system partitions a track into straight and curved segments. The system identifies optimal traversals through each segment from historical traversal data. The system stitches the optimal traversals together and smooths the optimal traversals at the transition points between track segments. The system verifies that the smoothed traversals meet one or more kinematic criteria before outputting the optimal traversal path.

20 Claims, 7 Drawing Sheets

OPTIMUM LAP DERIVATION VIA TRACK SEGMENTATION AND PRIOR RACING MEASUREMENTS

TECHNICAL FIELD

The present disclosure relates to optimizing track traversal by stitching together and smoothing traversals for individual consecutive track segments.

BACKGROUND

Identifying the fastest path around a racetrack may involve many factors. For a racetrack that includes non-linear portions, the racing vehicle may need to accelerate and decelerate in different sections of the track. The racing vehicle may need to move closer to a reference line in some section of track, and away from the reference line in other sections, for example, moving outward from a center line to optimize an approach into a turn. Human drivers typically need many hours of practice to develop an optimal path that minimizes the time to complete a lap of the racetrack. Some automated optimizations techniques require time-consuming machine learning. Other automated optimization techniques require a number of user-set parameters which may be difficult to set correctly the first time.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. TRACK TRAVERSAL OPTIMIZATION ARCHITECTURE
3. SEGMENTING AND SMOOTHING A TRACK AND SEGMENT TRAVERSALS
4. EXAMPLE EMBODIMENT
5. PRACTICAL APPLICATIONS, ADVANTAGES, AND IMPROVEMENTS
6. COMPUTER NETWORKS AND CLOUD NETWORKS
7. HARDWARE OVERVIEW
8. MISCELLANEOUS; EXTENSIONS

1. GENERAL OVERVIEW

One or more embodiments compute a traversal path for a racetrack by partitioning the racetrack into segments based on rates of change associated respectively with pairs of positions along the racetrack, selecting traversals for each segment, stitching together/smoothing the selected traversals based on kinematic principles. The system initially segments a track into straight and curved segments. A system identifies, from historical data, the fastest traversal times for each segment. The system selects the traversal paths corresponding to the fastest traversal times for each segment and stitches the traversal paths together to form a complete track traversal. At each transition from one track segment to an adjacent track segment, the system smooths the traversal paths between the two segments to create an optimized traversal for the track. The system also tests whether the optimized traversal for the track meets one or more kinematic criteria, i.e., whether it is possible for the racing vehicle to physically perform the optimized traversal. If the optimized traversal does not meet the kinematic criteria, the system automatically adjusts one or more parameters and attempts to smooth the traversal paths with the adjusted parameters.

One or more embodiments described in this Specification and/or recited in the claims may not be included in this General Overview section.

2. TRACK TRAVERSAL OPTIMIZATION ARCHITECTURE

Figure 1:
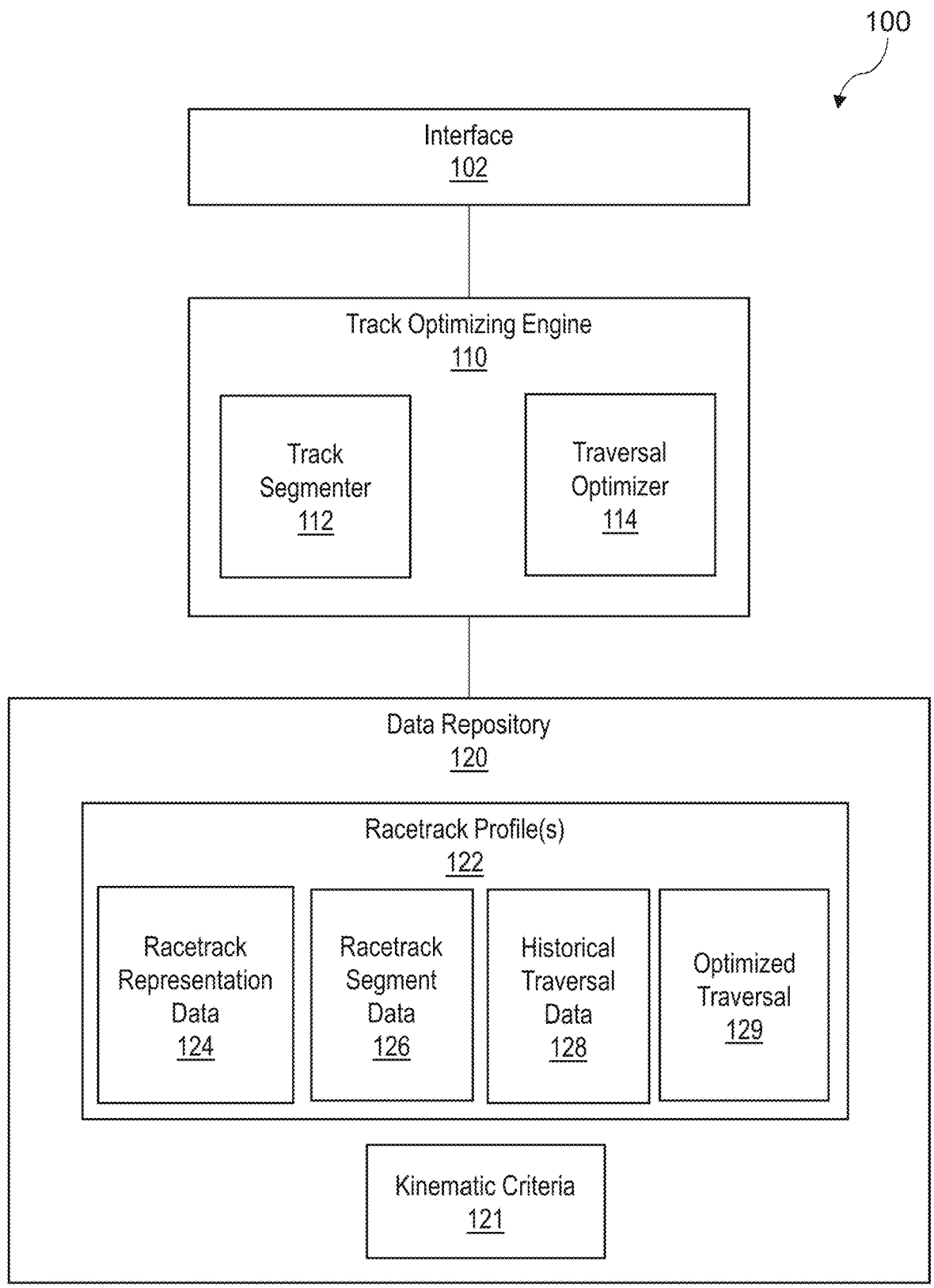
FIG. 1 illustrates a system in accordance with one or more embodiments.

FIG. 1 illustrates a system 100 in accordance with one or more embodiments. As illustrated in FIG. 1, system 100 includes an interface 102, a track optimizing engine 110, and a data repository 120. The track optimizing engine 110 may include one or more functional components such as a track segmenter 112 and a traversal optimizer 114.

In one or more embodiments, the track optimizing engine 110 refers to hardware and/or software configured to perform operations described herein for partitioning a racetrack into straight and curved segments and for stitching together and smoothing fastest historical traversals from the segments to obtain an optimized track traversal. The track optimizing engine 110 may receive racetrack representation data 124 via the interface 102, or from a software application (not shown) that requests an optimized track traversal. The racetrack representation data 124 may include a set of coordinates for the racetrack in two-dimensional space. The racetrack representation data 124 may include coordinate data for points along one or more reference lines of the racetrack, for example, a center line, an inside border line, or an outside border line. The coordinates may be, for example, Cartesian (x, y) coordinates, Global Positioning System (GPS) coordinates, or coordinates in a reference-line-based coordinate system, e.g., Frenet space. The track optimizing engine 110 may store an optimized traversal 129 from the traversal optimizer 114 on the data repository 120. The optimized traversal 129 may include coordinate data that defines a traversal path along the track. The optimized traversal 129 may include velocity data associated with the coordinate data that defines the velocity at which the race vehicle should travel for the optimized traversal. Additionally, or alternatively, the track optimizing engine 110 may present the optimized traversal 129 via the interface 102, for example, as a visual representation of the optimized traversal 129 on an image of the corresponding racetrack, or as a set of coordinates and velocities.

The track segmenter 112 refers to hardware and/or software configured to use the racetrack representation data 124 to determine a rate of change between points along the reference line of the track. The track segmenter 112 determines a rate of change category between successive pairs of points, where the rate of change category may be a positive rate of change, a negative rate of change, or an approximately null rate of change. The track segmenter 112 groups successive points together into a segment when the group of points shares the same rate of change category. Examples of operations for track segmentation are described below with reference to FIGS. 2A and 3.

The traversal optimizer 114 refers to hardware and/or software configured to identify, for each segment, the fastest traversal for that segment from historical traversal data 128. The traversal optimizer 114 concatenates all of the identified fastest traversals and smooths any discontinuous connections at each transition from one segment to the next segment. The traversal optimizer 114 also tests the resulting smoothed traversal for kinematic compliance with kinematic criteria 121. The kinematic criteria 121 may include specifications for what speed and acceleration a race vehicle is capable of. The kinematic criteria 121 may include data defining physical characteristics of the track, such as banking angles on turns, surface materials and coefficients of friction, and maximum safe speeds. A kinematically-compliant smoothed traversal may be stored as the optimized traversal 129. Examples of operations for computing an optimized smoothed track traversal are described below with reference to FIG. 2B.

In one or more embodiments, a data repository 120 is any type of storage unit and/or device (e.g., a file system, database, collection of tables, or any other storage mechanism) for storing data. Further, a data repository 120 may include multiple different storage units and/or devices. The multiple different storage units and/or devices may or may not be of the same type or located at the same physical site. Further, a data repository 120 may be implemented or executed on the same computing system as track optimizing engine 110. Alternatively, or additionally, a data repository 120 may be implemented or executed on a computing system separate from track optimizing engine 110. The data repository 120 may be communicatively coupled to track optimizing engine 110 via a direct connection or via a network.

Information describing data sequences and processing parameters may be implemented across any of the components within the system 100. However, this information is illustrated within the data repository 120 for purposes of clarity and explanation.

In an embodiment, the system 100 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

In one or more embodiments, interface 102 refers to hardware and/or software configured to facilitate communications between a user and the track optimizing engine 110. Interface 102 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 102 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 102 is specified in one or more other languages, such as Java, C, or C++.

In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in Section 6, titled "Computer Networks and Cloud Networks."

3. SEGMENTING AND SMOOTHING A TRACK AND SEGMENT TRAVERSALS

Figure 2A:
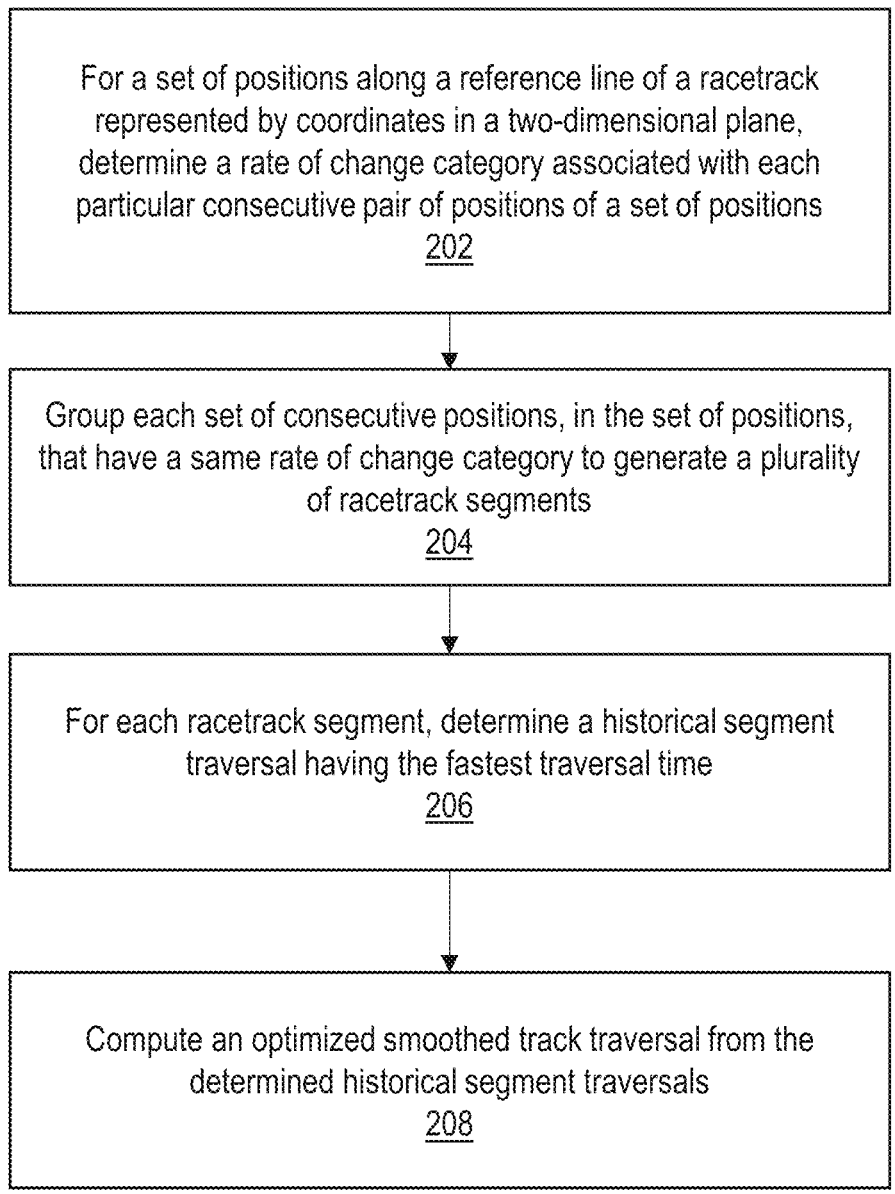
FIG. 2A illustrates an example set of operations for segmenting a track and optimizing a traversal in accordance with one or more embodiments.

FIG. 2A illustrates an example set of operations for segmenting a track and optimizing a traversal in accordance with one or more embodiments. One or more operations illustrated in FIG. 2A may be modified, rearranged, or omitted all together. Accordingly, the particular sequence of operations illustrated in FIG. 2A should not be construed as limiting the scope of one or more embodiments.

In one or more embodiments, the track segmenter 112 determines a rate of change category associated with each consecutive pair of positions of a set of positions along a reference line of a racetrack represented by coordinates in a two-dimensional plane (Operation 202). The track segmenter 112 may determine an angle $\alpha$ of the reference line between the points in a pair: $\alpha=\tan^{-1}\Delta y/\Delta x$. The track segmenter 112 may then determine the rate of change in the angle $\alpha$, for example, by taking the derivative of angle $\alpha$ at each point. When the rate of change changes sign, the corresponding point where the change of sign occurs may be a candidate transition point between two track segments. For points where the rate of change is zero, or below a threshold that approximates zero, e.g., 0.003 or 0.002, the points may be part of a straight track segment. An illustration of a track segmentation is described below in reference to FIG. 3.

In one or more embodiments, the track segmenter 112 groups each set of consecutive positions, in the set of positions, that have a same rate of change category to generate a plurality of racetrack segments (Operation 204). For example, the track segmenter 112 may group consecutive adjacent points each associated with an approximately null rate of change together into one straight segment, even if the track segmenter 112 initially determined one or more additional candidate transition points among the points in the straight segment. The track segmenter 112 may group consecutive adjacent points between two candidate transition points together, when each point is associated with a positive rate of change. The track segmenter 112 may group consecutive adjacent points between two candidate transition points together, when each point is associated with a negative rate of change.

In one or more embodiments, the traversal optimizer 114 determines a historical segment traversal having the fastest traversal time for each of the track segments (Operation 206). The historical traversal data 128 may include traversal path coordinates and traversal velocities for one or more race vehicles' previously traveled laps around the track. The historical traversal data 128 may be recorded in discrete measurement frames. In some embodiments, the traversal optimizer 114 may convert coordinates that define the segments into a coordinate system used by the measurement frames. For example, if the segments are defined by Cartesian coordinates, the traversal optimizer 114 may convert the Cartesian coordinates to Frenet coordinates when the measurement frames are defined in Frenet coordinates. Frenet coordinates define a longitudinal distance from the start of the track (s) and a latitude distance (d) from a reference line.

The traversal optimizer 114 may determine, for each measurement frame, based on the measurement frame's longitudinal position, the track segment to which the measurement frame belongs. For each track segment, the traversal optimizer 114 may identify the fastest traversal time through that track segment from the multiple laps through that segment. In some embodiments, this may correspond to the lap traversal having the fewest measurement frames through the segment.

In one or more embodiments, the traversal optimizer 114 computes an optimized smoothed track traversal from the determined historical segment traversals (Operation 208). The traversal optimizer 114 may select the fastest historical segment traversals and may combine them end to end. When the end of one traversal is discontinuous with the start of the next traversal in sequence, the traversal optimizer 114 smooths the connection at the transition by changing the values at the end of the first traversal, the start of the next traversal, or both, to produce a continuous and smooth traversal from one segment to the next. A discontinuity at the transition between two segments may be a discontinuity in one or more traversal characteristics (metrics) including longitudinal displacement, lateral distance, and/or side-slip angle. Higher order metrics, such as velocity and acceleration may be derived later from these first-order metrics.

Examples of operations for computing an optimized smoothed track traversal are described below with reference to FIG. 2B.

Figure 2B:
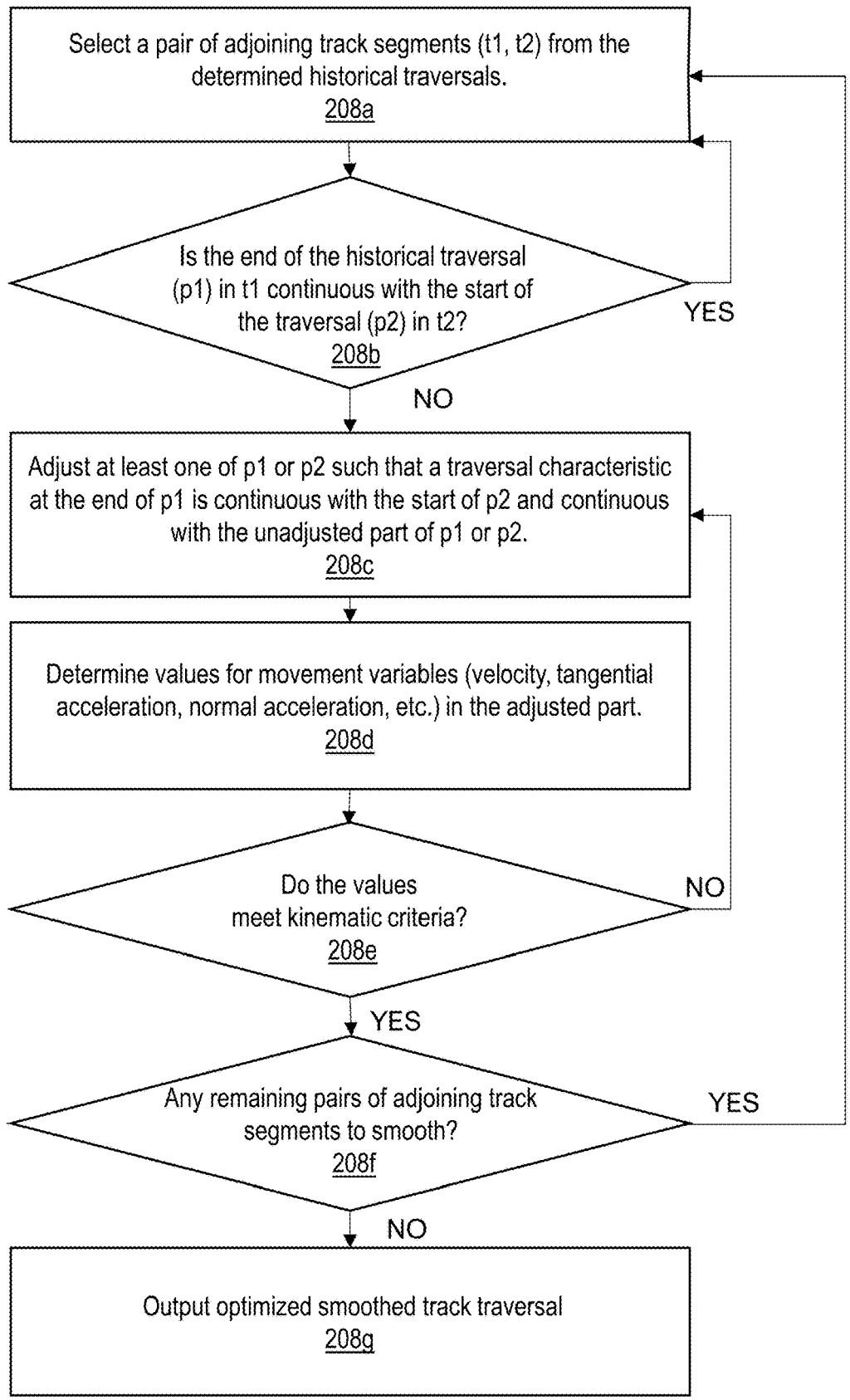
FIG. 2B illustrates an example set of operations for optimizing a track traversal from historical traversal data in accordance with one or more embodiments.

FIG. 2B illustrates an example set of operations for optimizing a track traversal from historical traversal data in accordance with one or more embodiments for Operation 208. One or more operations illustrated in FIG. 2B may be modified, rearranged, or omitted all together. Accordingly, the particular sequence of operations illustrated in FIG. 2B should not be construed as limiting the scope of one or more embodiments.

In one or more embodiments, the traversal optimizer 114 selects a pair of adjacent track segments, t1 and t2, and the respective fastest historical traversal associated with each selected track segment (Operation 208*a*). The traversal optimizer 114 may begin with the track segment defined by the start line of the track and the adjacent points (in the direction of travel) that have the same rate of change category, and the next adjacent track segment as defined by the direction of travel.

In one or more embodiments, the traversal optimizer 114 determines whether the end of traversal p1 in t1 is continuous with the beginning of traversal p2 in t2 (Operation 208*b*). The two traversals may be continuous when the value of a traversal characteristic at the end of p1 is the same or nearly same as the value of the traversal characteristic at the beginning of p2. A traversal characteristic can include a longitudinal distance from the start of the track (s), a latitude distance (d) from a reference line, and/or a sideslip angle. A sideslip angle represents an angle between the velocity angle of the race vehicle and the direction that the race vehicle is facing. Two traversals may be continuous when a race vehicle traveling along p1 can continue onto p2 without having to change position or sideslip angle in a way that is not possible according to physical laws and the capabilities of the race vehicle. When the end of traversal p1 in t1 is continuous with the beginning of traversal p2 in t2, the traversal optimizer 114 may return to Operation 208*a* and select a next pair of track segments where the next pair includes the second track segment of the previous pair, e.g., t2 and t3.

When the two traversals p1 and p2 are not continuous for at least one of the travel characteristics, in one or more embodiments, the traversal optimizer 114 adjusts the values in p1, p2, or both, such that a traversal characteristic at the end of p1 is continuous with the beginning of p2 (Operation 208*c*). The traversal optimizer 114 may define a sequence vector of univariate values of a traversal characteristic spanning the two consecutive portions:

$$x = \{x_0, x_1, \ldots, x_{m-1}, x_m\} \wedge \{x_{m+1}, x_{m+2}, \ldots, x_{n-1}, x_n\}.$$

In this example, p1 includes the points $\{x_0, x_1, \ldots, x_{m-1}, x_m\}$ and p2 includes the points $\{x_{m+1}, x_{m+2}, \ldots, x_{n-1}, x_n\}$. The traversal optimizer 114 may select an index j behind the transition point m between segments t1 and t2, and an index k forward of the transition point m (i.e., in segment t2), and a degree l of a polynomial fitting function. The traversal optimizer 114 then adjusts j, k, and l to minimize the following:

$$\|\hat{x}_{m-j} - x_{m-j-1}\| + \|\hat{x}_{m+1} - x_{m+1}\|.$$

$\|\hat{x}_{m-j}-x_{m-j-1}\|$ represents the difference between the existing value $x_{m-j-1}$ in p1 and a newly estimated next value in the sequence $\hat{x}_{m-j}$. Minimizing this difference acts to smooth a step between the historical traversal value and a newly smoothed value within the portion of the segment being smoothed.

$\|\hat{x}_{m+1}-x_{m+1}\|$ represents the difference between a newly estimated first value in p2 $\hat{x}_{m+1}$ and the existing value at the same index $\hat{x}_{m+1}$. Minimizing this difference acts to minimize the deviation between the newly interpolated driving line from the p1 into p2.

The traversal optimizer 114 estimates values in the sequence by fitting an i-degree polynomial to $\{x_0, x_1, \ldots, x_{m-j-1}\} \cup \{x_{m+1}, x_{m+2}, \ldots, x_{n-1}, x_n\}$ and predicting $\{\hat{x}_{m-j}, \hat{x}_{m-j+1}, \ldots, \hat{x}_{m-1}, \hat{x}_m\} \cup \{\hat{x}_{m+1}, \hat{x}_{m+2}, \ldots, \hat{x}_{m+k}, \hat{x}_{m+k+1}\}$. Any polynomial fitting method may be used, e.g., the method of least-squares.

In one or more embodiments, the traversal optimizer 114 determines the values of movement variables associated with the adjusted portion of p1 and/or p2 (Operation 208d). The traversal optimizer 114 may derive a velocity for the adjusted portion, for example, using the distance traveled within the adjusted portion and the time of traversal through the portion of the track corresponding to the adjusted portion within the fastest historical traversal data. Additionally, the traversal optimizer 114 may derive an acceleration, e.g., a tangential acceleration, and/or a normal acceleration for the adjusted portion. The tangential acceleration refers to how much the velocity is changing within the adjusted portion. The normal acceleration refers to the change in the direction of velocity as the race vehicle moves laterally from the reference line within the adjusted portion.

In one or more embodiments, the traversal optimizer 114 determines whether the values of the movement variables meet kinematic criteria (Operation 208e). The traversal optimizer 114 may determine a velocity distribution from the historical segment traversals for the adjusted portion. The traversal optimizer 114 may determine a velocity significance probability that the derived velocity metric occurs within the velocity distribution. The traversal optimizer 114 may determine an acceleration distribution from the historical segment traversals for the adjusted portion. The traversal optimizer 114 may determine an acceleration significance probability that the derived acceleration metric occurs within the acceleration distribution.

The traversal optimizer 114 may compare the derived values of the movement variables with values of the same movement variables derived from the historical traversal data 128 via statistical significance tests for the transition between the pair of track segments. For example, when the velocity significance probability falls in a velocity probability range, then the adjusted portion meets kinematic criteria with respect to velocity. The velocity probability range may be between about 2% and about 98% of the velocity distribution. For example, if the velocity significance probability is less than 0.025 or greater than 0.975, the adjusted portion does not meet kinematic criteria with respect to velocity. This example assumes fixed-level significance testing with a significance level of 5%. The probability range may be adjusted according to kinematic requirements. When the acceleration significance probability falls in an acceleration probability range, then the adjusted portion meets kinematic criteria with respect to acceleration. The acceleration probability range may be between about 5% and about 95% of the acceleration distribution If the values of the movement variables are statistical outliers with respect to the values derived from the historical traversal data for the adjusted portion (i.e., the value falls outside of the probability range), then the adjusted traversal does not meet the kinematic criteria, indicating that the race vehicle is not physically capable of traveling the smoothed path. When this occurs, the traversal optimizer 114 returns to Operation 208c and adjusts at least one of j, k, or l and tries again.

When the value of the movement variables meet the kinematic criteria, in one or more embodiments, the traversal optimizer 114 determines whether there are any remaining pairs of track segment traversals to smooth (Operation 208f). When there are remaining pairs to smooth, the traversal optimizer 114 may return to Operation 208a and select a next pair of track segments where the next pair includes the second segment of the previous pair, e.g., t2 and t3.

In one or more embodiments, when there are no remaining pairs of track segment traversals to smooth, the traversal optimizer 114 outputs the smoothed track traversal (Operation 208g).

In one or more embodiments, Operations 208a-208g may be repeated for each different traversal characteristic.

4. EXAMPLE EMBODIMENT

A detailed example is described below for purposes of clarity. Components and/or operations described below should be understood as one specific example which may not be applicable to certain embodiments. Accordingly, components and/or operations described below should not be construed as limiting the scope of any of the claims.

Figure 3:
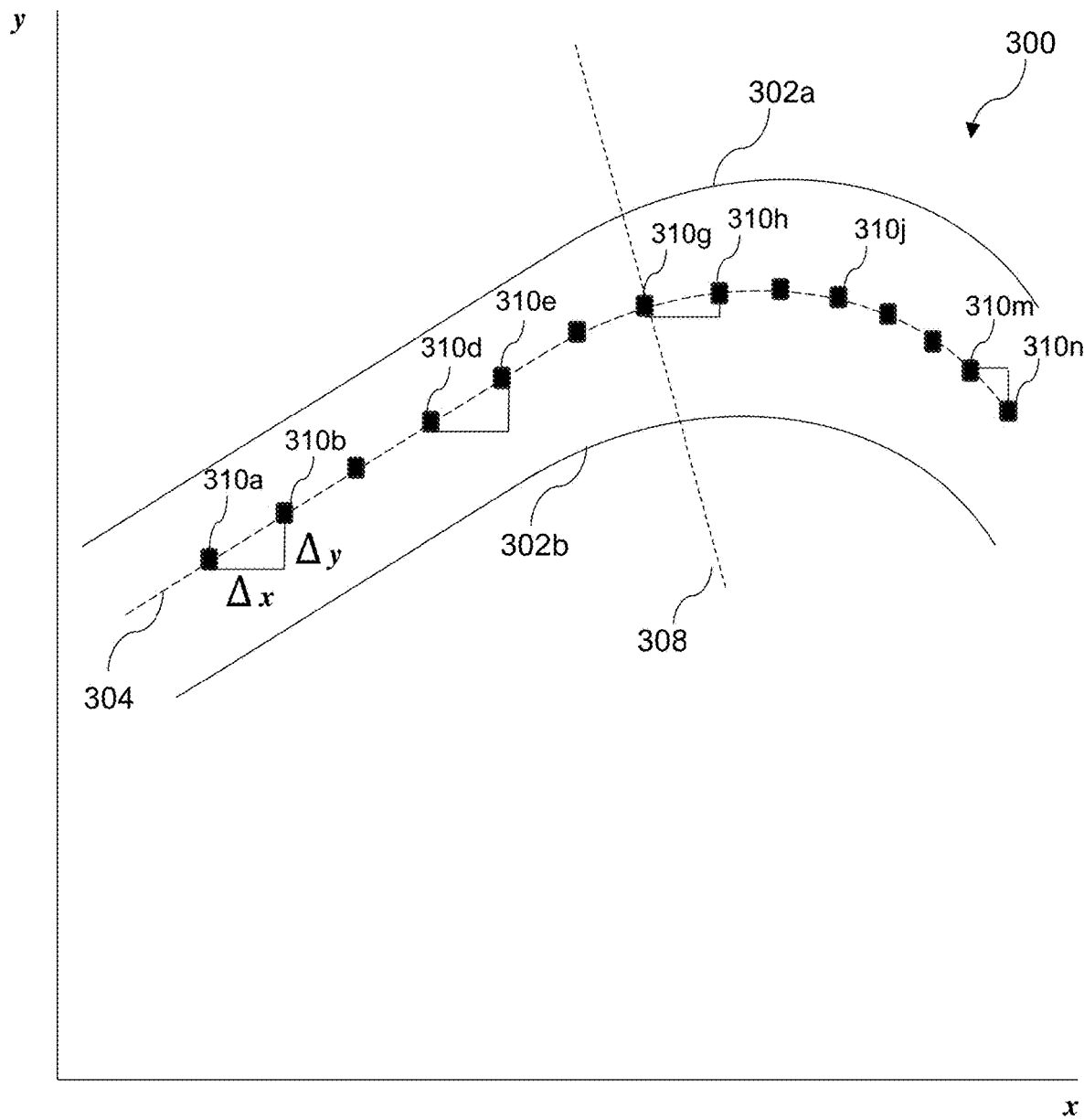
FIG. 3 illustrates an example of track segmentation in accordance with one or more embodiments.

FIG. 3 illustrates an example of track segmentation in accordance with one or more embodiments. FIG. 3 shows a portion 300 of a track. The track has a center line 304 and two border lines: 302a and 302b. One border line may be an inner border line and the other may be an outer border line. Any of lines 302a, 302b, or 304 may be used as a reference line. The points 310a, 310b . . . 310n may refer to positions on a reference line at various frame indices. As shown in FIG. 3, the track segmenter 112 may determine the angle of the reference line, in this example, center line 304, between points 310a and 310b, where $\Delta x$ represents the horizontal displacement between points 310a and 310b and $\Delta y$ represents the vertical displacement between points 310a and 310b. The track segmenter 112 may determine the angle of the reference line at each point 310, determined by $\Delta x$ and $\Delta y$ from the point to the point's subsequent neighboring point. As can be seen in the figure, the angle of the reference line remains relatively constant between points 310a and 310g. Then between point 310g and 310h, the angle begins to change and continues to change through point 310n.

The track segmenter 112 may determine the rate of change of the angle of the reference line, for example, by taking the derivative of the angle at each frame index. When the rate of change, e.g., the derivative, changes sign (i.e., the second-order derivative of the angle is non-zero), the frame index at which the change occurs becomes a candidate transition point from one segment to the next. The line 308 indicates a candidate transition point on the track portion 300 where one segment ends, and another begins.

The track segmenter 112 may also determine a radius of the track within a measurement frame. For example, for a given frame i, the track segmenter 112 may determine the radius of a curve between points a and b, centered at frame i. In FIG. 3, the track segmenter 112 may determine the radius of the curve from point 310g to point 310n at point 310j.

For each track portion between two candidate transition points, the track segmenter 112 may determine a distribution of all of the rates of change of the reference line angles within the track portion and then determine a median value of that distribution. The track segmenter 112 may also determine a radius distribution of all of the radii of the frames in the track portion and determine a minimum of the radius distribution. For the track portion, the track segmenter 112 may compare the median rate of change of the reference line angle to a first threshold and compare the minimum of the radius distribution to a second threshold to classify the track portion as a straight segment or a turn segment. The first threshold may be between 0 and about 0.009°/frame, e.g., 0.001°/frame, 0.003°/frame, 0.006°/frame, or 0.008°/frame. The second threshold may be between about 100 to 200 meters, e.g., 120 m, 145 m, 186 m, or 191 m. If the median rate of change of the reference line angle is below the first threshold and above the second threshold, the track portion may be classified as a straight segment. If the median rate of change of the reference line angle is above the first threshold and below the second threshold, the track portion may be classified as a turn segment. The track segmenter 112 may merge any consecutive adjacent straight portions into one straight portion.

Figure 4:
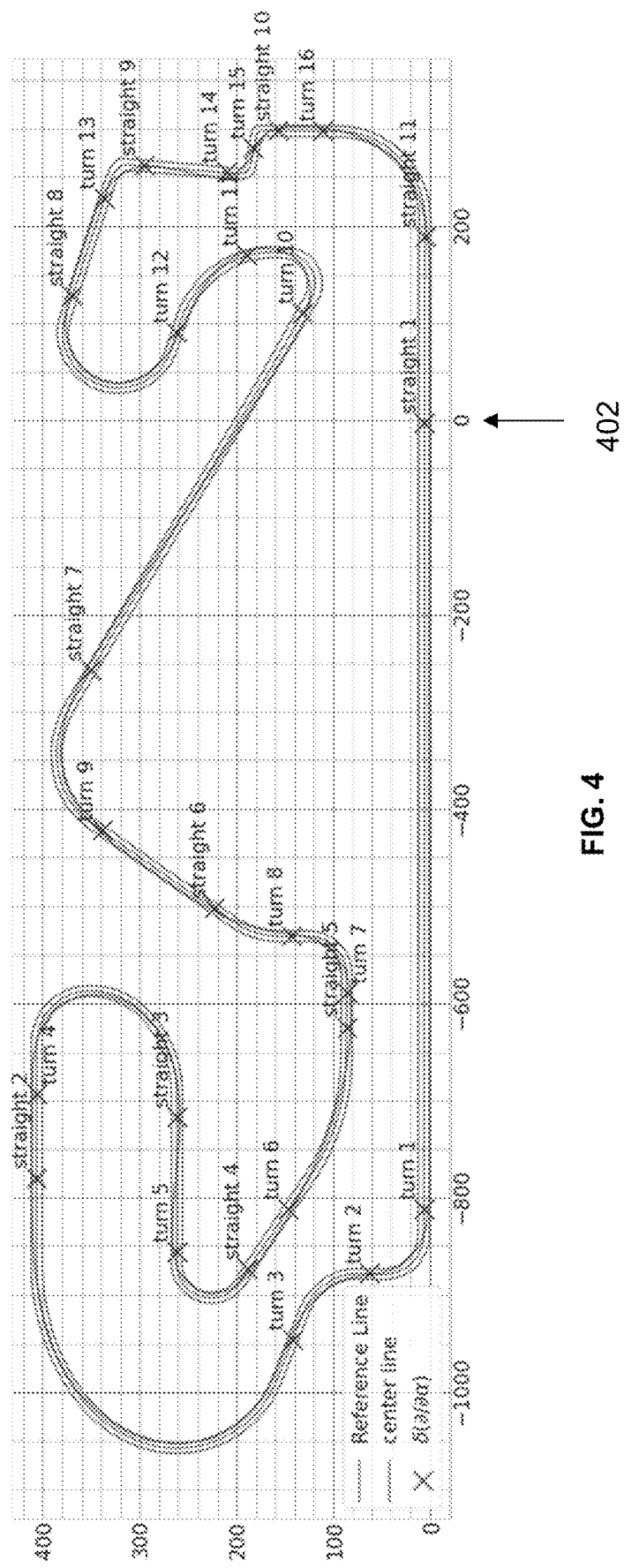
FIG. 4 illustrates an example of segmented track in accordance with one or more embodiments.

FIG. 4 illustrates an example of segmented track in accordance with one or more embodiments. The starting line 402 for the track is indexed at coordinate (0,0) and the direction of travel is clockwise. The portion of the track between point (0,0) and point (−800, 0) has an approximately null rate of change and is classified as a straight segment. In the track portion between the points labeled "turn 1" and "turn 2" (i.e., roughly between points (−801, 0) and (−900, 50)) the rate of change of the reference line becomes positive and the track portion is classified as a turn. In the track portion between the points labeled "turn 2" and "turn 3" (i.e., roughly between points (−900, 50) and (−950, 150)), the rate of change of the reference line becomes negative and the track portion is classified as a turn, albeit as a different turn than the previous turn.

If the starting line 402 were elsewhere on the track, one or more embodiments may have joined the straight segment shown from (200,0) to (0,0) with the straight segment shown from (0,0) to (−800, 0) to form one longer straight segment from (200,00) to (−800,0). The division of this straight portion of the illustrated track is a result of the selection of the starting point and not due to a change in the rate of change category between the two segments.

Figure 5:
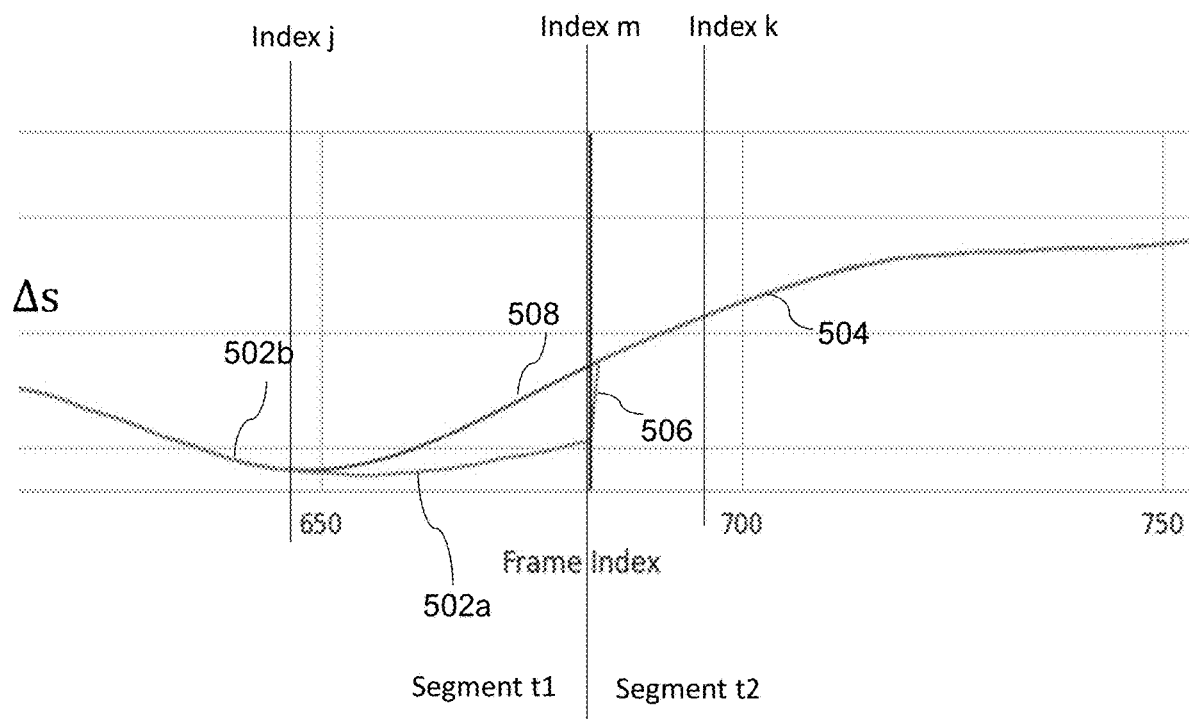
FIG. 5 illustrates an example of two adjacent track segments and their respective optimal traversal positions as a function of frame number.

FIG. 5 illustrates an example of two adjacent track segments t1 and t2, and the respective fastest historical traversals. The traversals are shown as changes in position (Δs) as a function of frame number, before and after smoothing. The line 502 (502a and 502b) represents the traversal p1 in segment t1. The line 504 represents the traversal p2 in segment t2. The index m indicates the transition point between t1 and t2. The lines 502 and 504 also represent the velocity of the traversals. Assuming a fixed frame rate, the frame index also corresponds to a time, and Δs divided by time equals velocity. Accordingly, the figure shows, for example, a slowing velocity from the left to roughly frame index 650, and an increasing velocity from roughly frame index 650 to index m.

The end of 502a does not connect to the beginning of the line 504 and is therefore not continuous with line 504. The traversal optimizer 114 has connected the two traversals (prior to smoothing) by the line 506. The line 506 represents an abrupt positional transition between the two traversals and would likely not be possible for the race vehicle to travel. The line 506 also corresponds to a sudden and large increase in velocity. The line 508 represents the smoothed traversal from p1 to p2, where the values of a portion of the end of p2 are changed to connect the two traversals smoothly.

In the illustrated example, the end of traversal p1 is adjusted to smooth the transition from line 502 to line 504. In one or more embodiments, the beginning of line 504 could be adjusted instead, or portions of both 502 and 504 could be adjusted to smooth the transition. The traversal optimizer 114 may initially select the index j according to a default value or a user-supplied parameter. For example, a default value of j may be 5, 8, or 10. Similarly, the indices k and l may be selected according to a default value or a user-supplied parameter. In some embodiments, a limit may be placed on how large the value of an index may become, e.g., 80 or 100, to prevent the process from adjusting an excessive amount of the traversal and/or to prevent the method from failing to converge on a solution.

In one or more embodiments, the default value of the indices may be determined according to whether the track segment in which the index occurs is a straight segment or a curved segment. In some embodiments, in curved segment, the default value of the index j and/or k may be determined according to the radius of curvature of the segment. For example, a curved segment having a small radius of curvature may be associated with a smaller index j compared to a curved segment having a relatively larger radius of curvature.

As illustrated, the traversal optimizer 114 has adjusted the values of the points on the portion 502a of p1 between index j and index m. The portion 502b before index j is not adjusted. The adjusted portion is shown as line 508. Line 508 may represent the traversal values that reduce or minimize the transition between the point at j−1 and the point at j, as well as reducing or minimizing the transition between the point at m and the point at m+1. If the new traversal 508 somehow does not meet the kinematic criteria for the track portion between index j and index k, then the traversal optimizer 114 may adjust j, e.g., by increasing or decreasing the value of j. Alternatively, or additionally, the traversal optimizer 114 may adjust k, e.g., by increasing or decreasing the value of k. Alternatively, or additionally, the traversal optimizer 114 may adjust the polynomial degree l of the polynomial fitting function.

5. PRACTICAL APPLICATIONS, ADVANTAGES, AND IMPROVEMENTS

Inferring the optimum driving line around a racetrack conventionally has required the racing driver to identify what areas of the track they can maximize their speed, where and when to brake, and the angle and direction that the car should be heading in at certain points. Such knowledge is inferred by the driver from repetitions of the track and reviewing where time was lost and gained. However, this process can be both laborious and resource (time and money) intensive. Additionally, this manual process does not allow for quantification of the optimum driving line (i.e. at a specific position the car should be following this specific line) and relies on subjective judgments of the line to take.

Conventional solutions for identifying an optimal driving line include modelling the dynamics of a track and inferring the optimum racing line that maximizes a car's potential energy; learning a recurrent neural network from video footage and car measurements to improve car trajectory planning; and using genetic algorithms to evolve driving lines and assess their global fit on the track. Such techniques often propose driving lines which may not be feasible (given the kinematic model of the car) or require extensive training and tuning to learn the optimum line.

Still other techniques segment a track into partitions of equal length, regardless of track contours. These techniques may require a large number of smoothing operations due to the large number of transitions at the borders of the equal-size segments.

One or more embodiments improve on conventional approaches. For example, the one or more embodiments do not rely on learning a model of the car moving around the track, which can be a time-consuming process, and do not produce repeated inferred laps from which to draw the optimum lap, as in Markov Chain Monte Carlo methods. Further, by segmenting the track into straight and curved portions and only stitching and smoothing disparate segment traversals at transition points, the one or more embodiments capitalize on the observation that drivers usually follow a consistent path within a track segment such that smoothing is only needed at the transitions.

The one or more embodiments need only a few parameters to derive the optimal lap compared to conventional parameterized methods. For example, only the center line angle derivative and curve radius thresholds may need to be set. From an initial set of starting values for the j, k, and l values discussed above, the track optimizing engine 110 may autonomously arrive at the optimized smoothed traversals with no user intervention required.

Still further, by using prior, existing racing measurements that are known to be feasible, the track optimizing engine 110 may derive an optimum lap that adheres to kinematic constraints, thereby avoiding the requirement for a generative kinematic model.

6. COMPUTER NETWORKS AND CLOUD NETWORKS

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 6:
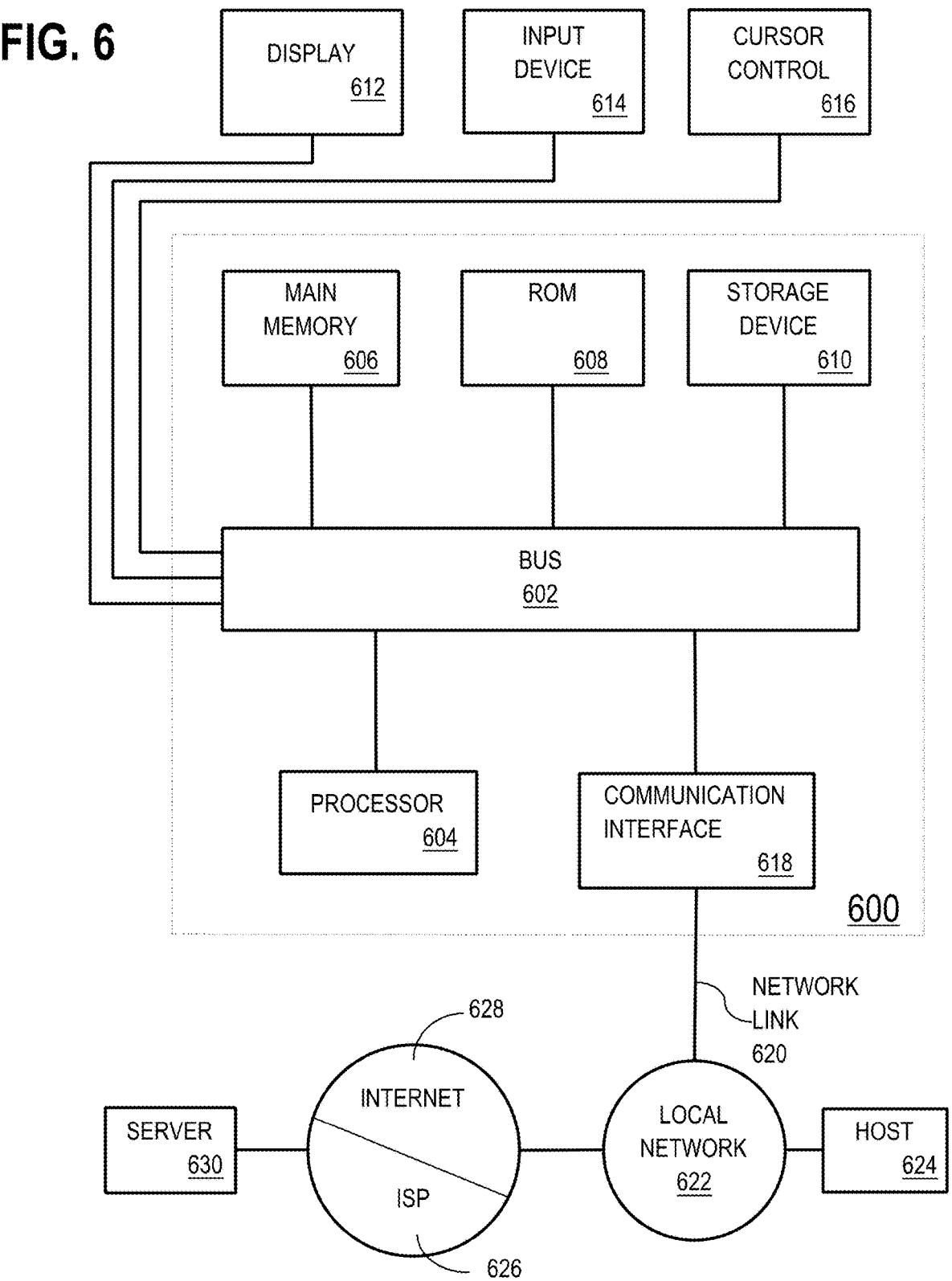
FIG. 6 shows a block diagram that illustrates a computer system in accordance with one or more embodiments.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general-purpose microprocessor.

Computer system 600 also includes a main memory 606, such as a random-access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

8. MISCELLANEOUS; EXTENSIONS

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer readable media comprising instructions which, when executed by one or more hardware processors, cause performance of operations comprising:
   obtaining a representation of a track, the representation comprising a plurality of positions along a reference line of the track represented by coordinates in a two-dimensional plane;
   determining a rate of change category associated with each particular consecutive pair of positions of a plurality of positions, the rate of change category being one of: a positive rate of change, a negative rate of change, or an approximately null rate of change;
   partitioning the plurality of positions into a plurality of track segments, wherein each track segment in the plurality of track segments comprises consecutive positions that form pairs of positions having a same rate of change category;
   determining a plurality of target segment traversals for the plurality of track segments at least by:
      for a particular track segment of the plurality of track segments:
         identifying a set of historical segment traversals for the particular track segment, each particular historical segment traversal of the set of historical segment traversals defining a velocity and a lateral position along the track at each of a set of positions along the particular historical segment traversal;
         selecting a target segment traversal, from the set of historical segment traversals, for the particular track segment based at least on a traversal time corresponding to the target segment traversal;
   computing an optimized track traversal for the track based on the determined plurality of target segment traversals.

2. The one or more media of claim 1, wherein computing the optimized track traversal for the track based on the plurality of target segment traversals is based at least in part on:
   identifying a pair of target segment traversals corresponding to adjoining track segments of the plurality of track segments, wherein a first value of a traversal characteristic at an end of a first target segment traversal of the pair of adjoining target segment traversals is different than a second value of the traversal characteristic at a start of a second target segment traversal of the pair of adjoining target segment traversals; and
   applying a first modification to a first portion of at least one of the first target segment traversal and the second target segment traversal to reduce a difference between the first value at the end of the first target segment traversal and the second value at the start of the second target segment traversal.

3. The one or more media of claim 2, wherein applying the first modification further comprises reducing a difference between a changed value of the traversal characteristic in the first portion and an unmodified value of the traversal characteristic in a second portion of the at least one of the first target segment traversal and the second target segment traversal.

4. The one or more media of claim 2, further comprising:
   determining whether applying the first modification results in a traversal that meets one or more kinematic criteria; and
   applying a second modification to at least one of the first target segment traversal and the second target segment traversal when the first modification results in a traversal that does not meet the one or more kinematic criteria.

5. The one or more media of claim 4, wherein determining that the traversal meets one or more kinematic criteria comprises:
   determining a derived velocity for the modified first portion;
   determining a velocity distribution from the historical segment traversals for the first portion;
   determining a velocity significance probability that the derived velocity metric occurs within the velocity distribution; and
   determining that the modification meets the one or more kinematic criteria when the velocity significance probability falls in a first probability range.

6. The one or more media of claim 4, wherein determining that the traversal meets one or more kinematic criteria comprises:
   determining an acceleration metric for the modified first portion;
   determining an acceleration distribution from the historical segment traversals for the first portion;
   determining an acceleration significance probability that the derived acceleration metric occurs within the acceleration distribution; and
   determining that the modification meets the one or more kinematic criteria when the acceleration significance probability falls in a second probability range.

7. The one or more media of claim 4, wherein applying a second modification comprises:
   selecting a third portion of the at least one of the first target segment traversal and the second target segment traversal and applying the second modification to the third portion.

8. The one or more media of claim 2, wherein the traversal characteristic comprises one of: a longitudinal displacement from a start line, a lateral displacement from a reference line, or a sideslip angle.

9. The one or more media of claim 1, wherein selecting a target segment traversal from the set of historical segment traversals comprises selecting the target segment traversal corresponding to the shortest time of traversal for the segment.

10. One or more non-transitory computer readable media comprising instructions which, when executed by one or more hardware processors, cause performance of operations comprising:
    obtaining traversal data for each of a plurality of track segments, the traversal data comprising at least one of a traversal time and a traversal position within a respective track segment;
    identifying a pair of segment traversals corresponding to adjoining track segments of the plurality of track segments, wherein a first value of a traversal characteristic at an end of a first segment traversal of the pair of adjoining segment traversals is different than a second value of the traversal characteristic at a start of a second segment traversal of the pair of adjoining segment traversals;
    applying a first candidate modification to a first portion of at least one of the first segment traversal and the second segment traversal to reduce a difference between the first value at the end of the first segment traversal and the second value at the start of the second segment traversal;

determining that applying the first candidate modification results in a traversal through the pair of segments that does not meet one or more kinematic criteria;

applying a second candidate modification to a second portion of at least one of the first segment traversal and the second segment traversal to reduce a difference between the first value at the end of the first segment traversal and the second value at the start of the second segment traversal;

determining that applying the second candidate modification results in a traversal through the pair of segments that does meet the one or more kinematic criteria; and responsive to determining that the second candidate modification results in a traversal that meets the one or more kinematic criteria, generating an optimized track segment traversal that includes the modified second portion resulting from applying the second candidate modification to the second portion.

11. The one or more media of claim 10, wherein applying the first candidate modification comprises:
adjusting values of the traversal characteristic in the first portion to reduce the difference between the first value and the second value.

12. The one or more media of claim 10, wherein applying the second candidate modification comprises:
selecting the second portion of the at least one of the first segment traversal and the second segment traversal, wherein the second portion comprises at least a part of the first portion; and
adjusting values of the traversal characteristic in the third portion to reduce the difference between the first value and the second value.

13. The one or more media of claim 10, wherein applying the first candidate modification further comprises:
reducing a difference between a changed value of the traversal characteristic in the first portion and an unmodified value of the traversal characteristic in a different portion of the at least one of the first segment traversal and the second segment traversal.

14. The one or more media of claim 10, wherein a first track segment of the plurality of segments comprises an approximately straight portion of the track and wherein a second track segment of the plurality of segments comprises a curved portion of the track, wherein the curved portion is defined by the same radius for the points in the second segment.

15. A system comprising:
one or more processors; and
memory storing instructions that, when executed by the one or more processors, cause the system to perform:
obtaining a representation of a track, the representation comprising a plurality of positions along a reference line of the track represented by coordinates in a two-dimensional plane;
determining a rate of change category associated with each particular consecutive pair of positions of a plurality of positions, the rate of change category being one of: a positive rate of change, a negative rate of change, or an approximately null rate of change;
partitioning the plurality of positions into a plurality of track segments, wherein each track segment in the plurality of track segments comprises consecutive positions that form pairs of positions having a same rate of change category;
determining a plurality of target segment traversals for the plurality of track segments at least by:
for a particular track segment of the plurality of track segments:
identifying a set of historical segment traversals for the particular track segment, each particular historical segment traversal of the set of historical segment traversals defining a velocity and a lateral position along the track at each of a set of positions along the particular historical segment traversal;
selecting a target segment traversal, from the set of historical segment traversals, for the particular track segment based at least on a traversal time corresponding to the target segment traversal;
computing an optimized track traversal for the track based on the determined plurality of target segment traversals.

16. The system of claim 15, wherein computing the optimized track traversal for the track based on the plurality of target segment traversals is based at least on:
identifying a pair of target segment traversals corresponding to adjoining track segments of the plurality of track segments, wherein a first value of a traversal characteristic at an end of a first target segment traversal of the pair of adjoining target segment traversals is different than a second value of the traversal characteristic at a start of a second target segment traversal of the pair of adjoining target segment traversals;
applying a first modification to a first portion of at least one of the first target segment traversal and the second target segment traversal to reduce a difference between the first value at the end of the first target segment traversal and the second value at the start of the second target segment traversal.

17. The system of claim 16, wherein applying the first modification further comprises reducing a difference between a changed value of the traversal characteristic in the first portion and an unmodified value of the traversal characteristic in a second portion of the at least one of the first target segment traversal and the second target segment traversal.

18. The system of claim 16, further comprising:
determining whether applying the first modification results in a traversal that meets one or more kinematic criteria; and
applying a second modification to at least one of the first target segment traversal and the second target segment traversal when the first modification results in a traversal that does not meet the one or more kinematic criteria.

19. The system of claim 18, wherein determining that the traversal meets one or more kinematic criteria comprises:
determining a movement variable metric for the modified first portion;
determining a movement variable distribution from the historical segment traversals for the first portion;
determining a movement variable significance probability that the derived movement variable metric occurs within the movement variable distribution; and
determining that the modification meets the one or more kinematic criteria when the movement variable significance probability falls in a first probability range.

20. The system of claim 18, wherein applying a second modification comprises:

selecting a third portion of the at least one of the first target segment traversal and the second target segment traversal and applying the second modification to the third portion.

* * * * *